No. 771,967. PATENTED OCT. 11, 1904.
L. BLOUNT.
BALING PRESS.
APPLICATION FILED NOV. 2, 1903.
NO MODEL.
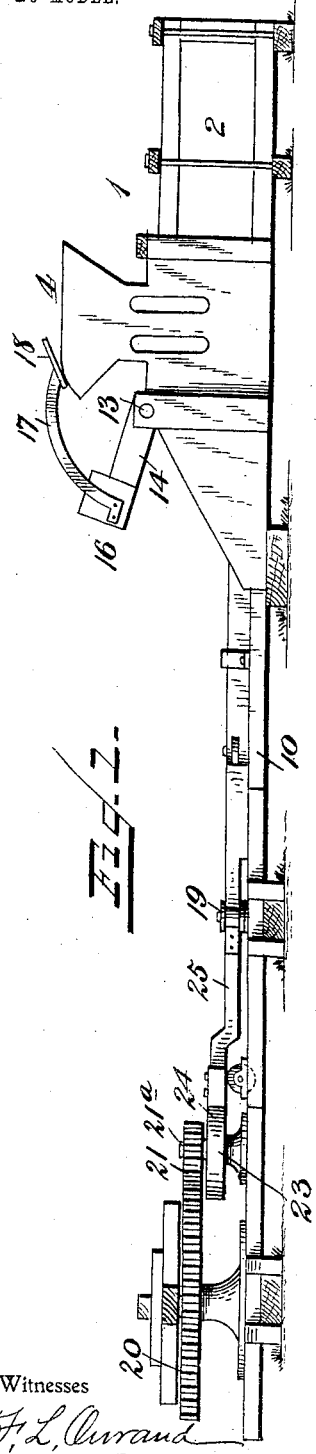
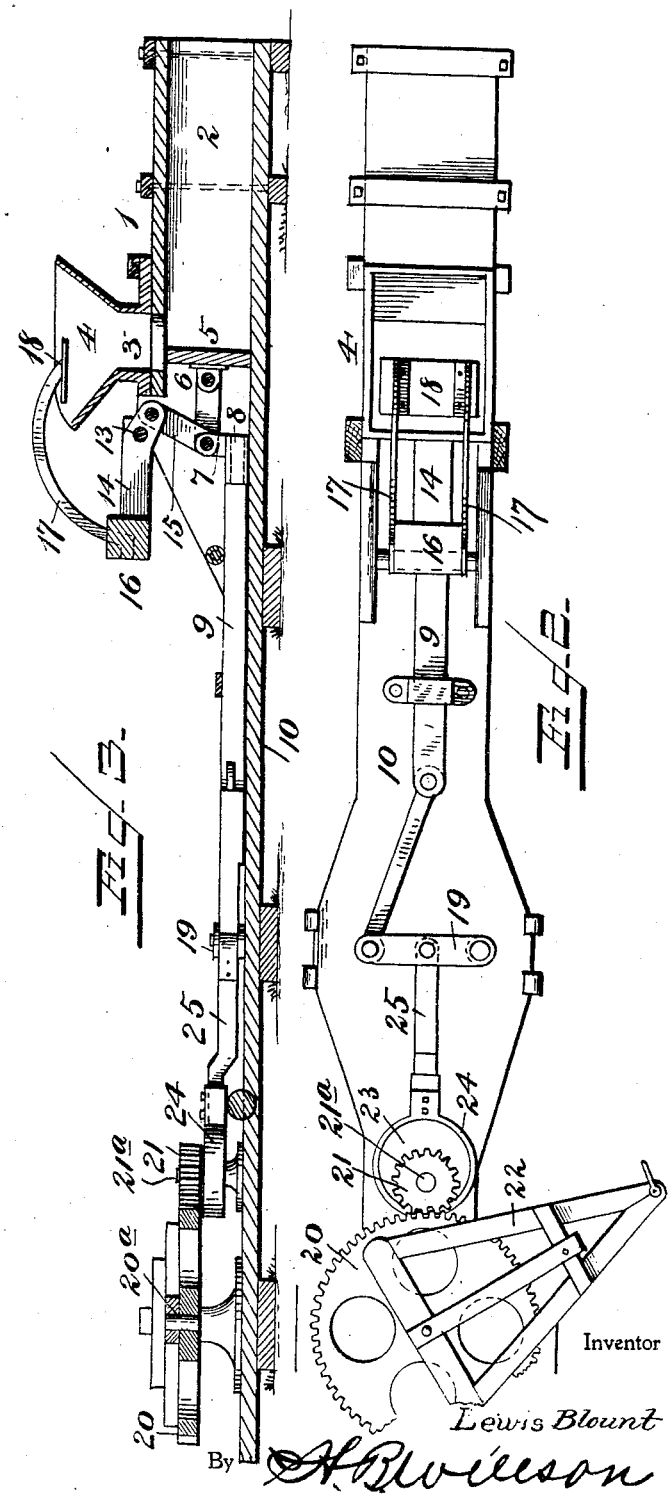
Witnesses
F. L. Ourand
Inventor
Lewis Blount
By H. B. Wilson
Attorney No. 771,967. Patented October 11, 1904.

UNITED STATES PATENT OFFICE.

LEWIS BLOUNT, OF RALEIGH, NORTH CAROLINA, ASSIGNOR, BY DIRECT AND MESNE ASSIGNMENTS, OF TWO-THIRDS TO THOMAS B. WILKINSON AND ROBERT N. SIMMS, OF RALEIGH, NORTH CAROLINA.

BALING-PRESS.

SPECIFICATION forming part of Letters Patent No. 771,967, dated October 11, 1904.

Application filed November 2, 1903. Serial No. 179,604. (No model.)

*To all whom it may concern:*

Be it known that I, LEWIS BLOUNT, a citizen of the United States, residing at Raleigh, in the county of Wake and State of North Carolina, have invented certain new and useful Improvements in Baling-Presses; and I do declare the following to be a full, clear, and exact description of the invention, such as will enable others skilled in the art to which it appertains to make and use the same.

This invention relates to improvements in baling-presses for hay or other fibrous material.

The object of the invention is to increase the efficiency of machines of this character by providing mechanism whereby the strokes of the plunger will be multiplied and at the same time reduce the strain or pull on the team by taking up the recoil of the plunger after each compression.

A further object is to provide for the elimination of springs from the operating mechanism, thereby simplifying the construction and increasing the strength and durability of the same.

With these and other objects in view the invention consists of certain novel features of construction, combination, and arrangement of parts, as will be more fully described, and particulary pointed out in the appended claim.

In the accompanying drawings, Figure 1 is a side elevation of a baling-press embodying the invention. Fig. 2 is a top plan view. Fig. 3 is a vertical longitudinal sectional view of the same.

Referring more particularly to the drawings, 1 denotes the press, consisting of the usual baling-chamber 2, having a feed-opening 3, over which is arranged the hopper 4. Arranged to reciprocate in the baling-chamber is a plunger 5, fixed on the end of a plunger-rod 6, which is preferably in the form of two parallel bars or rods connected at their opposite ends to an upwardly-projecting lug 7, formed on the end of a cuff or ferrule 8, which is fixed to the end of a longitudinally-disposed pitman or operating rod 9, slidably mounted in guides on the base 10 of the machine.

Between the forwardly-extending sides of the frame is pivotally mounted, as at 13, an angularly-bent elbow-lever 14, the lower and inner end of which is pivotally connected to the upper ends of links 15, the lower ends of which are pivotally connected to the lug 7 on the ferrule 8 of pitman-rod 9. On the outer end of the lever 14 is fixed a counterbalancing-weight 16, and to said end are also connected the lower ends of two upwardly-projecting forwardly-curved arms or bars 17, to the outer ends of which is secured a feed-plunger 18, which is adapted to enter the hopper and force the hay down into the baling-chamber.

The outer end of the pitman or operating rod 9 is pivotally secured to one end of a rocker-arm 19, the opposite end of which is pivotally connected to the base 10, as shown. The rocker-arm 19 is preferably in the form of parallel bars spaced apart, and between which is pivoted the end of the pitman-rod. In order to reciprocate said pitman-rod and actuate the plunger 5, suitable operating mechanism is provided, consisting of a horizontally-arranged power-wheel 20, which in the present instance is shown as a spur gear-wheel, and a gear-pinion 21, with which said power-wheel is in mesh. The wheel 20 and pinion 21 are suitably mounted on vertically-disposed stub-shafts 20ª and 21ª, fixed to the base 10. Any suitable power may be applied to the wheel 20 to drive the same. In the present instance is shown a sweep 22, fixedly connected at one end to said wheel and provided at its opposite end with a clevis, to which a horse or team may be attached. On the lower side of the pinion 21 is formed an eccentric or cam 23, around which is arranged an eccentric-strap 24, provided with a forwardly-extending rod or bar 25, the free end of which is pivotally connected to the rocker-arm 19 between the pivotal connection of the same to the base and the pivotal connection of the pitman-rod at the opposite end thereof. The pivotal connection of the eccentric-rod is slightly nearer the pivotal point of the rocker-arm than the opposite end of the same. The diameter of the power gear-wheel 20 is preferably three times as great as that of the pinion 21, so that at every revolution of the larger wheel the pinion will make three revolutions, thereby causing a rapid reciprocation of the plunger. By the use of the rocker-arm 19 a much greater length of stroke can be given the plunger than by connecting the eccentric-strap directly with the pitman and also permitting the use of much smaller gear-wheels and eccentric.

The counterbalancing-weight 16 is arranged on the end of the lever 14 to take up the jar occasioned by the recoil of the plunger after each stroke, thereby relieving the team from the strain of such jars. The weight 16 also assists in forcing the plunger into the baling-chamber by the pressure exerted upon the outer end of the lever 14, which pressure is transmitted to said plunger through the links 15.

By the swinging of the weighted lever 14 the feed-plunger is brought into and out of the hopper at the proper time to force the hay into the baling-chamber, as will be understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

In a baling-press, the combination with a baling-chamber, having a feed-opening and a hopper, of a plunger and a plunger-rod arranged to reciprocate in said chamber, a pitman-rod pivotally connected at one end to said plunger-rod, a bent lever pivoted to said press and having one end connected to said plunger-rod, a counterbalancing-weight carried by the opposite end of said lever whereby the jar occasioned by the recoil of said plunger is taken up, and means arranged at the opposite end of said pitman-rod, whereby the same is rapidly reciprocated, substantially as described.

In testimony whereof I have hereunto set my hand in presence of two subscribing witnesses.

LEWIS BLOUNT.

Witnesses:
E. H. COOLEY,
F. W. LUCAS.